Feb. 24, 1925.
W. N. FRANK
GAUGE
Filed Feb. 12, 1923
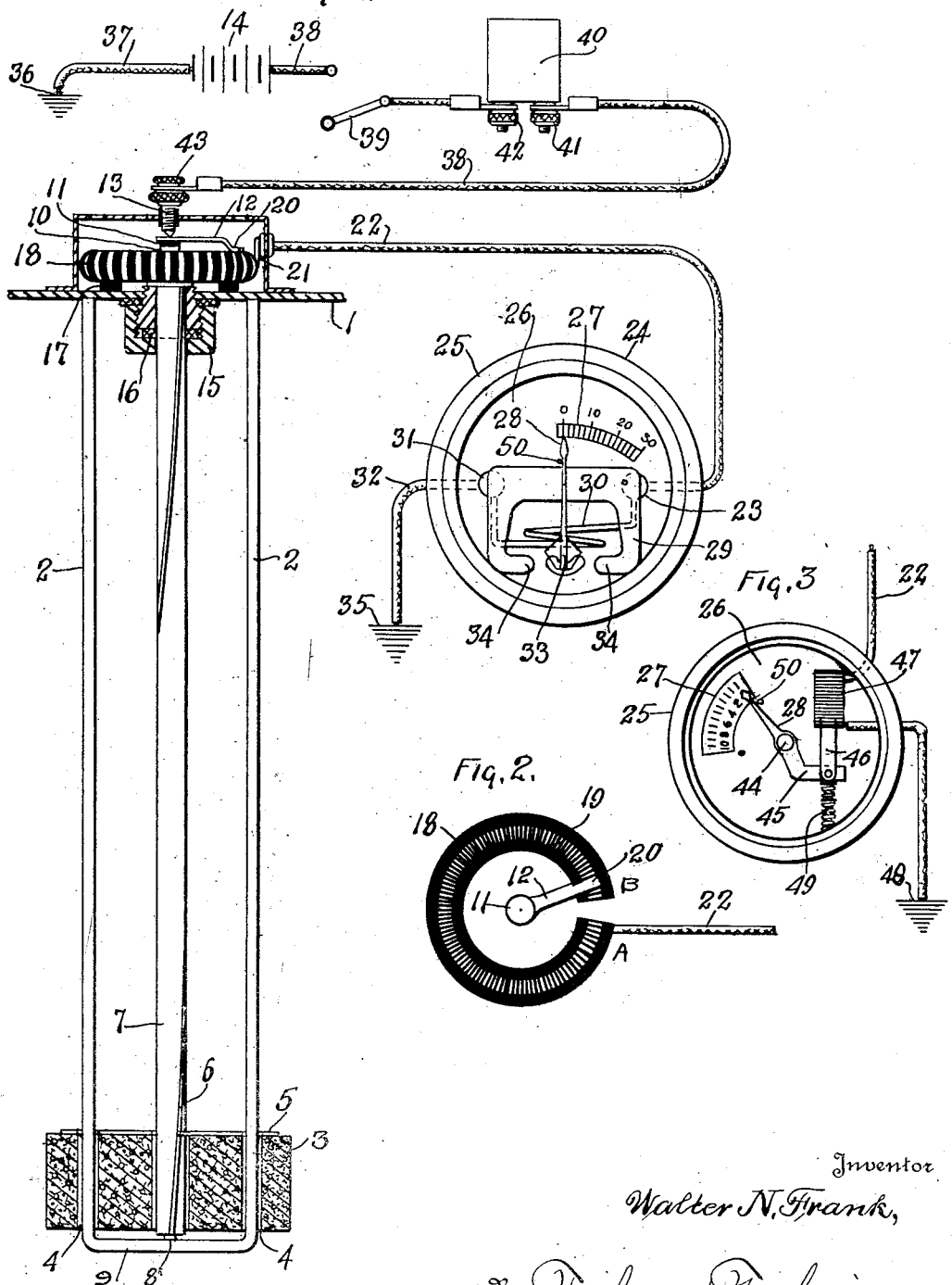
Inventor
Walter N. Frank,
By Toulmin & Toulmin,
Attorneys Patented Feb. 24, 1925.

1,527,430

UNITED STATES PATENT OFFICE.

WALTER N. FRANK, OF DAYTON, OHIO, ASSIGNOR, BY MESNE ASSIGNMENTS, TO THE GROLAN MANUFACTURING COMPANY, OF DAYTON, OHIO, A CORPORATION OF DELAWARE.

GAUGE.

Application filed February 12, 1923. Serial No. 618,680.

*To all whom it may concern:*

Be it known that I, WALTER N. FRANK, a citizen of the United States, residing at Dayton, in the county of Montgomery and State of Ohio, have invented certain new and useful Improvements in Gauges, of which the following is a specification, reference being had therein to the accompanying drawing.

My invention relates to gauges, and in particular to gauges for indicating the height of liquids in containers.

It is the object of my invention to provide a combined mechanically actuated and electrically operated gauge.

It is my object to provide a gauge combination having a mechanical actuator and electrical means of indicating the degree of actuation.

Figure 1 illustrates the mechanical actuator and the electrical indicator with the connecting means therebetween, including the source of current.

Figure 2 is a plan view in detail of the resistance winding.

Figure 3 is an illustration of the modified form of electrically actuated indicator.

Referring to the drawings in detail, 1 designates the top of the tank, such as a gasoline tank on automobiles, from which is suspended a U-shaped float guide rod 2. Mounted on the arms of this float guide and loosely traveling thereon is a float 3 preferably made of cork. The float has a passageway 4 therein for the reception of the arms of the float guide 2. On top of the float is carried a plate 5 which engages with the worm 6 on the worm shaft 7. This worm shaft is journalled at 8 on the horizontal portion 9 of the float guide, which also acts as a limiting stop for the cork float 3. The top of the worm shaft is connected to the projecting shaft 10 which projects outside of the tank. Upon this shaft 10 is mounted an insulating block 11 which separates the shaft from the contact finger 12. The several parts are kept in position by a binding post screw 13 which also serves as a conductor for current from the source of supply which is a battery 14.

The worm shaft 7 at its upper end is surrounded by a gland 15 and packing washers 16 to prevent the escape of the liquid out of the tank. A broken ring of insulated wire surrounds the shaft 10 and is mounted on the tank on the insulation supports 17. This broken ring is designated 18. The wire is wound up on a coil if desired, so that there are series of coils of wire having their sides adjacent to one another arranged about the common center, which center is the center of the shaft 7 and the shaft 10. The upper surface of this ring 18 has the insulation removed as indicated at 19 so that the end 20 of the contact finger 12 may successively engage the exposed wires to form the contact therewith. One end of this coil is connected at 21 to a cable 22 which leads to the binding post 23 of the dashboard indicator 24. The dashboard indicator as shown in Figure 1 consists of a rim 25 which encloses preferably a glass face 26 which covers the graduations 27 on the dial. The finger or pointer 28 moves over the graduations when actuated, as hereinafter described. A permanent magnet 29 serves to maintain the finger in its zero or vertical position while the passage of current through the cable 22, binding post 23, wire 30, binding post 31 and the cable 32 will actuate the pointer 29 in the usual manner. The pointer is freely pivoted at 33 adjacent the horns 34 of the magnet. The cable 32 is grounded as at 35. The source of supply of current, such as the battery 14 is grounded at 36 by the cable 37, while the other side of the battery is attached to the cable 38. On this cable there is mounted a switch 39. In line 38 is also interposed a rheostat 40 where the cables are connected thereto by the binding posts 41 and 42. The free end of the cable is connected to the binding screw 13 by a nut 43.

As to Figure 3, the indicator is provided with a conventional rim 25 and a glass 26 with a graduation on the dial such as 27. The finger or pointer 28 is pivoted at 44 and has an arm 45 connected thereto. This arm is pivoted thereon in armature 46 of a solenoid 47 to which the cable 22 is connected. The other end of the solenoid is grounded as at 48. The solenoid is kept in its outermost position by a spring 49 which is connected to the arm 45. A zero stop 50 is provided in both types of indicator for limiting the movement of the pointer in one direction.

Method of operation: When the tank is empty, the cork float is in the position shown in Figure 1, at the bottom of the float guide, and the needle 28 is at the zero position on the scale 27. When the current is admitted to the line by closing the switch 39, the gauge is in condition for operation. If the parts are in the position shown in Figures 1, 2 and 3, then the tank is empty, and the finger 12 is at a position as shown, where there is the greatest resistance interposed in the line of the passage of current due to the largest number of coils of wire of the ring 18 having been put in the circuit.

When the tank is filled the rising of the float as a result thereof will rotate the worm shaft 7 and the finger 12 so that when the tank is full the finger will move to the position marked "A" in Figure 2 and away from the position marked "B" in Figure 2. There being therefore the least resistance in the line due to the cutting out of the coils of wire by the movement of 12 to position "A", the current will then have its greatest effect upon the needle 28, due to the passage of current through the wire 30, moving the needle to the position of indicating a full tank. This position would be opposite the number "30" in Figure 1, on the scale 27, upon the assumption that the tank was a thirty-gallon tank. As the gasoline is used out of the tank, the float drops and the finger 12 cuts in a greater number of coils of wire in increasing degrees and by increasing the resistance, reduces the amount of current influencing the needle 28 which returns towards the zero point, as it is normally held in that position by the stabilizing magnet 29.

In the case of the type of gauge or indicator shown in Figure 3, the greater the amount of current allowed to flow through the solenoid 47, the greater the pull on the magnet 46 and therefore the greater the actuation of the finger 28 and the movement of it towards the upper ranges of the scale, against the resistance of the spring 49. As the tank becomes empty, and the resistance greater through the agency of the coil 18, the more effective is the spring 49 and the armature 46 gradually moves out of the solenoid 47.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

In combination with a float rotated shaft, a resistance coil concentric with said shaft, above which the shaft projects, an insulating block on the upper end of said shaft, a contact finger fixed on said insulating block, the other end of said contact finger engaging said resistance coil, a housing surrounding said shaft, resistance coil, insulating block and contact finger, and a binding post screw coaxial with said shaft extending through said housing and adapted to form a pivot bearing for said contact finger, said binding post screw also serving as a conductor for the source of supply.

In testimony whereof, I affix my signature.

WALTER N. FRANK.